United States Patent [19]
Beierle et al.

[11] Patent Number: 5,351,234
[45] Date of Patent: Sep. 27, 1994

[54] SYSTEM FOR INTEGRATED DISTRIBUTION OF SWITCHED VOICE AND TELEVISION ON COAXIAL CABLE

[75] Inventors: John D. Beierle, Danbury, Conn.; William C. G. Ortel, New York, N.Y.

[73] Assignee: Nynex Corporation, Del.

[21] Appl. No.: 635,751

[22] Filed: Dec. 28, 1990

[51] Int. Cl.$^5$ .............................................. H04J 4/00
[52] U.S. Cl. .................... 370/49.5; 370/50; 370/71; 370/76; 370/124; 379/242
[58] Field of Search .................. 370/49.5, 50, 124, 71, 370/76; 379/242; 455/3.1

[56] References Cited

U.S. PATENT DOCUMENTS

| | | | |
|---|---|---|---|
| 4,075,429 | 2/1978 | Takahata et al. | 370/70 X |
| 4,513,315 | 4/1985 | Dekker et al. | 370/50X |
| 4,564,940 | 1/1986 | Yahata | 370/124 |
| 4,813,035 | 3/1989 | Bishop et al. | 370/50 |

FOREIGN PATENT DOCUMENTS

| | | | |
|---|---|---|---|
| 3729585A1 | of 1989 | Fed. Rep. of Germany | H04Q 11/00 |
| 0386482 | 9/1990 | Fed. Rep. of Germany | H04Q 11/00 |

OTHER PUBLICATIONS

First Pacific Networks Brochure entitled Personal Xchange TM Technology: A Value–Added Solution for Cable Television dated Feb. 1989.

*Primary Examiner*—Douglas W. Olms
*Assistant Examiner*—Russell W. Blum
*Attorney, Agent, or Firm*—John R. Berres; John J. Torrente

[57] ABSTRACT

A system for voice distribution amongst a plurality of telephone subscriber locations operating on a broadband cable network wherein RF transmitting and RF receiving channels for carrying voice and signalling information are established at the subscriber locations and coupled with the broad band network and a central switch is also coupled with the broadband network and enables each RF transmitting channel to be selectively coupled to any of the RF receiving channels.

31 Claims, 10 Drawing Sheets

5,351,234

SYSTEM FOR INTEGRATED DISTRIBUTION OF SWITCHED VOICE AND TELEVISION ON COAXIAL CABLE

BACKGROUND OF THE INVENTION

This invention relates to voice distribution and switching and, in particular, to combining voice distribution and switching with video distribution on a broadband coaxial cable network.

Video distribution systems are known wherein video signals are distributed over a broadband coaxial network to a large number of subscribers. Further, there are also known video/voice distribution systems in which a broadband coaxial network is used to provide voice distribution concurrent with video distribution.

Video/voice distribution systems are particularly advantageous in locations where broadband coaxial networks have already been installed for video distribution, but which lack independent voice distribution networks. In these locations, the cost associated with installing and maintaining an independent voice network can be eliminated by also utilizing the broadband coaxial network for voice distribution. Further, for locations which currently support voice distribution on an independent voice network, it may be desirable to add a voice distribution system to the existing coaxial video distribution system to reduce the voice traffic on the existing voice distribution network and/or to provide a redundant path for voice communications.

One example of a known video/voice distribution system utilizing a broadband coaxial network is a system proposed by First Pacific Networks (FPN). In the FPN system, corresponding broadband RF channels (typically, 6 MHz wide) serve as upstream and downstream highways for an associated group of voice channels. To avoid interference, these corresponding RF channels are offset or shifted in frequency by a fixed amount, e.g., 192.25 Mhz.

The FPN system, however, lacks any centralized control. Therefore, each voice channel must carry all its requisite control information. Because of this and since the FPN system uses digial as opposed to analog transmission, each voice channel is required to be approximately 180Kbits/second in capacity. Using typical 6 Mhz upstream/downstream RF channels, a maximum of about 28 voice channels can, therefore, be carried within a given upstream/downstream RF pair.

As a result of this limited voice channel capacity, the FPN system is not readily useable where large scale voice distribution is desired. Moreover, since there is no mechanism in the FPN system for permitting voice channels assigned to one RF channel pair to be able to communicate with voice channels assigned to another RF pair, increased capacity cannot be realized merely by allocating additional RF channels to voice distribution. In any case, such allocation would reduce the number of allowable video channels and provide only a limited number of additional voice channels per RF channel pair. Finally, the FPN system requires equipment at each subscriber location to process the extensive control information carried in the associated voice channel. This increases the complexity and cost of the equipment.

It is therefore a primary object of the present invention to provide an improved method and apparatus for utilizing a broadband coaxial network to provide voice distribution.

It is a further object of the present invention to provide a method and apparatus for providing voice distribution and switching among a large number of subscriber locations connected to a broadband cable network.

It is still a further object of the present invention to provide a method and apparatus for providing voice distribution and switching over a broadband cable network utilizing centralized control.

It is also an object of the present invention to provide a method and apparatus for a video/voice distribution system wherein the voice distribution is greatly improved.

SUMMARY OF THE INVENTION

In accordance with the principles of the present invention, the above and other objects are realized in an apparatus and method wherein a plurality of telephone user or subscriber locations is provided and wherein at each subscriber location an associated RF transmitting channel and an associated RF receiving channel are established for carrying voice and signalling information to and from, respectively, the subscriber location. A broadband cable network communicates with the subscriber locations and carries or couples with the associated RF transmitting and receiving channels. The cable network also communicates with a centralized switching and control means which is adapted to enable each RF transmitting channel carried by the network to be selectively coupled or switched to any one of the RF receiving channels, whereby voice communcation between the associated subscriber locations of the coupled channels can be carried out.

In the embodiment of the invention to be discussed hereinbelow, the switching means comprises a time division multiplex (TDM) switch and a frequency/time conversion means for establishing transmitting and receiving TDM digital channels corresponding to the transmitting and receiving RF channels so as to permit switching between channels by the TDM switch. Also, in the disclosed embodiment, the RF transmitting and receiving channels are analog channels organized into broadband RF channels of the cable network and each user location is assigned and coupled with the broadband RF channel containing its associated transmitting and receiving channels.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1A:
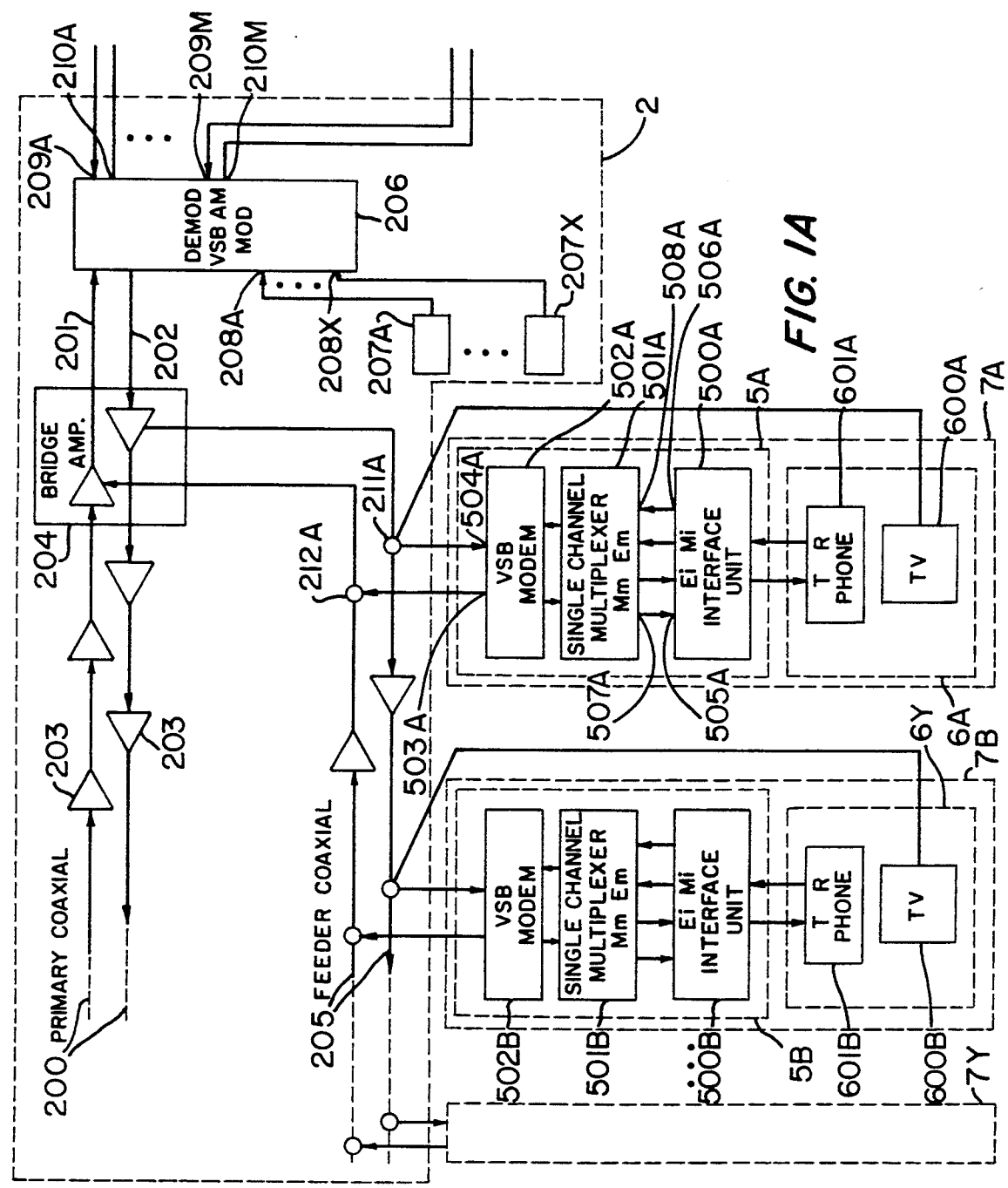
FIGS. 1A and 1B show a video/voice distribution system having voice distribution in accordance with the principles of the present invention.
Figure 1B:
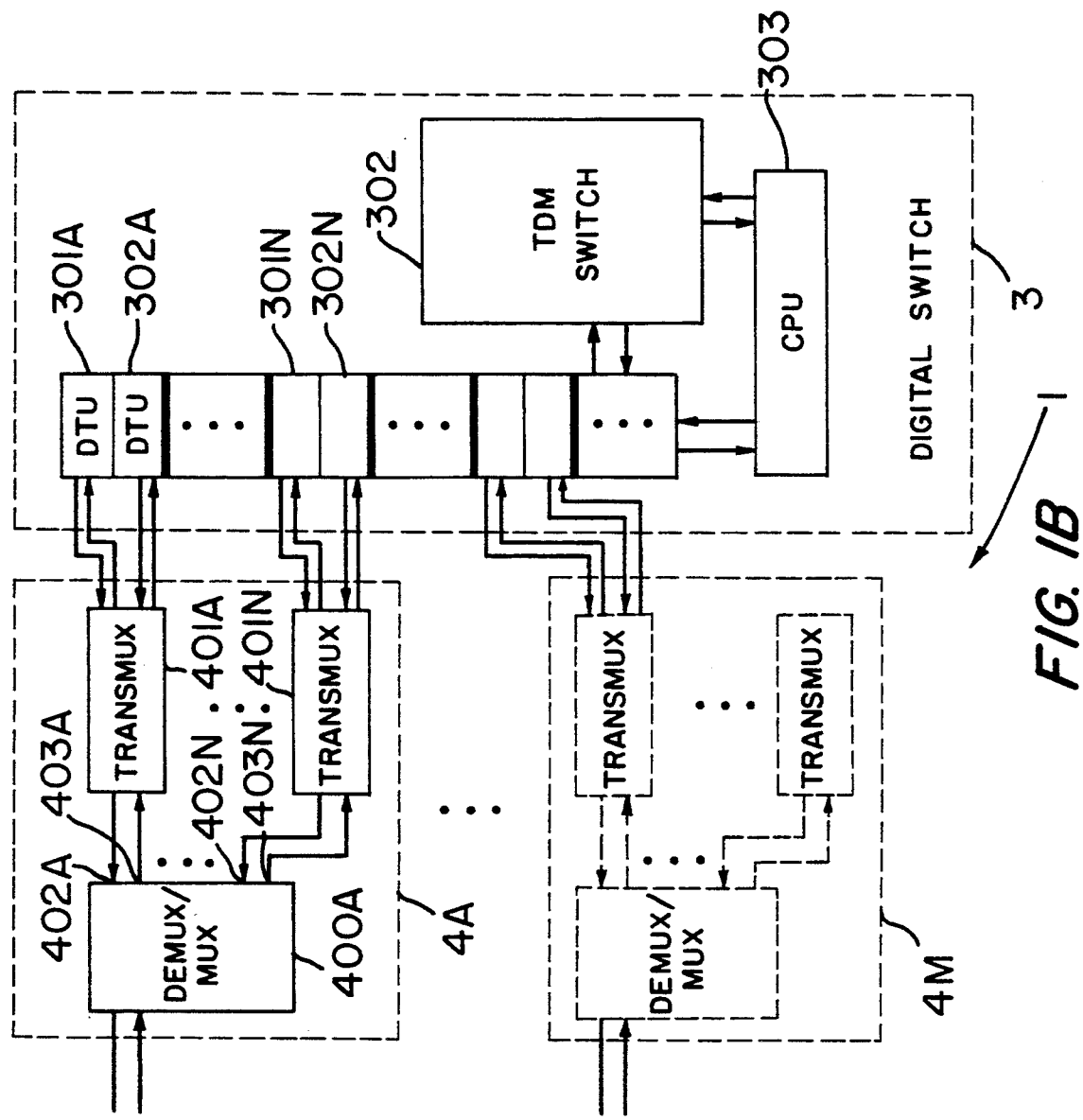

FIGS. 1A and 1B shows a system 1 for distributing video information and also voice information in accordance with the principles of the present invention. As shown, the system 1 comprises a broadband coaxial network 2 which carries voice and video RF channels to voice and video equipment at the subscriber locations 7A to 7Y.

More particularly, the broadband coaxial network 2 comprises a vestigial sideband ("VSB") demodulator/modulator 206 which transmits RF video channels and transmits and receives RF voice channels over a primary coaxial system 200 having feeder coaxial branches 205. The feeder coaxial branches 205 connect to the primary coaxial branch 200 through bridging amplifiers 204. They also connect to the televisions 600A-600Y at the subscriber locations 7A-7Y via drops 211A.

As shown, the coaxial branch 200 and each of its feeder branches 205 comprises an incoming or upstream coaxial cable 201 and an outgoing or downstream coaxial cable 202. Line amplifiers 203 are connected to the cables 201 and 202 at preselected intervals, e.g., intervals of approximately one half mile, to compensate for signal attenuation.

In the present case, the broadband coaxial network 2 is of the type typically used to distribute video signals and, thus, has a broad bandwidth reaching as high as about 900 Mhz. Furthermore, to permit concurrent distribution of multiple video signals on the network, the 900 Mhz bandwidth of the network is divided into multiple, contiguous broadband RF channels, each individual broadband RF channel being of sufficient bandwidth to carry an independent video signal. To accomodate standard video signals, each broadband RF channel would thus be approximately 6 MHz wide.

The VSB demodulator/modulator 206 receives input video signals 208A-208X from video or TV sources 207A-207X. Each video source 207A-207X might be an antenna or a satellite. The VSB demodulator/modulator 206 modulates the input video signals onto a network carrier so that the resultant network signal contains contiguous or multiplexed broadband RF channels each carrying one of the video signals. This network signal is placed on the downstream coaxial cable 202 and subsequently received and decoded by the televisions 600A-600Y located at the subscriber locations 7A-7Y.

In accordance with the principles of the present invention, the system 1 is further adapted to permit the distribution of voice informaton among the subscriber locations 7A-7Y, as well as the aforementioned video information. This is accomplished in a manner which allows for a relatively large number of selectively connectable voice channels and, therefore, a relatively large number of subscriber locations capable of voice communication with one another.

More particularly, in accordance with the invention, a number of broadband RF (i.e., 6 MHz) channels of the cable network 2 are used to carry voice information and associated signalling and control information among the subscriber locations. This is accomplished by adapting the system 1 for each subscriber location to establish associated RF transmitting and RF receiving voice channels and by allocating these voice channels to one or more of the broadband RF channels being used for voice transmission. It is further accomplished by adapting the system 1 to provide central switching and control of the RF transmitting and receiving voice channels such that each RF transmitting voice channel can be selectively switched or coupled to any one of the RF receiving voice channels. In this way, a voice path can be established between each subscriber location and any of the other subscriber locations in the system.

In the present illustrative embodiment, the RF transmitting and receiving voice channels of each subscriber location are established by a respective drop box (i.e., 5A, 5B . . . , 5Y) located at the particular subscriber location. The RF voice channels associated with the different subscriber locations furthermore, established by the respective drop boxes so that they form RF voice channel groups, each voice channel group being allocated to a different one of the RF broadband channels assigned to voice transmission and being carried by the network 2 carrier.

In the present case, since the network 2 includes an upstream cable 201 as well as a downstream cable 202, the RF transmitting voice channel and RF receiving voice channel of each subscriber location can occupy the same RF band. Also, because the RF receiving and RF transmitting voice channels of a given subscriber location can occupy the same RF band, they can also be carried in the same RF broadband channel of the cable network.

In the event the cable network 2 were modified to use only a single cable for upstream and dowsntream transmission, the RF transmitting and RF receiving voice channels would have to be offset from each other to prevent interference. In such situation, the channels would likely be required to occupy separate RF broadband channels of the cable network.

As above-indicated, the RF transmitting voice channel groups established by the subscriber locations are carried in the upstream cable 201 in the multiplexed broadband RF channels of the network 2. Similarly, the RF receiving voice channel groups are carried via the downstream cable 202 again in the multiplexed RF broadband channels of the network.

As also above indicated, the system 1 is adapted to provide centralized, selective switching or coupling of the voice information and associated signalling information in each RF transmitting channel to any one of the RF receiving channels. In the present illustrative example, this is effected by a digital switch 3, which is shown as including a TDM switch 302 and a CPU 309, and by a time/frequency converter assembly 4. The converter assembly 4 includes individual time/frequency converter units 4A to 4M, each assigned to a particular RF broadband channel carrying a frequency division multiplexed (FDM) RF voice channel group.

More particularly, after demodulation of the upstream network signal to produce the individual RF broadband channels, the modulator/demodulator 206 passes the broadband channels to respective output ports 210A to 210M connected to converter units 4A–4M, respectively. Each converter unit then converts the RF transmitting voice channels in its received RF broadband channel into corresponding digital voice channels and one or more control channels organized into one or more TDM signals for processing by the digital switch 3.

As a result of its processing, the digital switch 3 places voice and signalling information into digital voice channels and one or more control channels which correspond to the receiving RF voice channels. The switch 3 organizes these digital voice channels and control channels also into one or more TDM signals and conveys these signals to their associated converters 4A to 4M, i.e., to the respective converters assigned to the RF broadband channel carrying the corresponding RF voice channels. Each converter then converts its received digital channels into a corresponding FDM RF receiving voice channel group. Each receiving voice channel group is then delivered to the modulator/demodulator 206 where it is placed in the corresponding broadband RF channel and modulated onto the network carrier for subsequent delivery to the subscriber locations via the downstream cable 202.

In the present illustrative case of the use of TDM switch 302 in the digital switch 3, the digital voice channels transmitted between the switch and each of the converters 4A to 4M are contained in time slots of the generated TDM signals. Each time division multiplexed signal contains a number of digital voice channels, a synchronization channel and a control channel for control and signalling information.

The TDM signals are communicated to and from the TDM switch 302 by digital trunk units (DTUs) included in the switch 3. A group of these units is associated with each converter unit 4A to 4M (e.g., DTU's 301A to 301N and 302A to 302N are associated with converter 4A). Each converter unit 4A to 4M, in turn, comprises a number of time/frequency converters (e.g., TRANSMUXES 401A to 401N) each of which transmits and receives the TDM signals from a pair of DTUs (e.g., DTUs 301A and 302A are paired with TRANSMUX 401A).

Each of the TRANSMUXES in the units 4A to 4M converts its received digital voice channels and its received synchroniztion and control channels into a corresponding FDM sub-group of RF receiving voice channels. Each FDM channel sub-group is then combined by a demultiplexer/multiplexer (DEMUX/MUX) unit in the respective converter (e.g., DEMUX/MUX 400A in converter 4A) with other channel subgroups to generate an FDM RF channel group which is delivered to a respective receive port 209A to 209M on the modulator/demodulator 206.

In the other direction, the reverse process occurs in each of the converter units 4A to 4M. Thus, the FDM RF transmitting voice channel group received at each converter 4A to 4M is separated by the DEMUX/MUX into FDM sub-groups of RF transmit voice channels. These FDM sub-groups are then fed to respective TRANSMUXES, where they are converted to TDM time signals having corresponding digital transmit voice channels and associated synchronization and control channels. These TDM signals are delivered to corresponding DTUs and processing by the TDM switch 302.

Figure 2A:
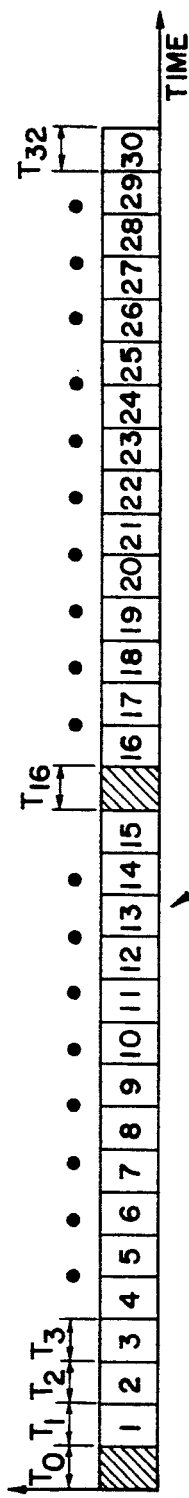
FIGS. 2A and 2B each show TDM voice channels used in the system of FIGS. 1A and 1B.
Figure 2B:
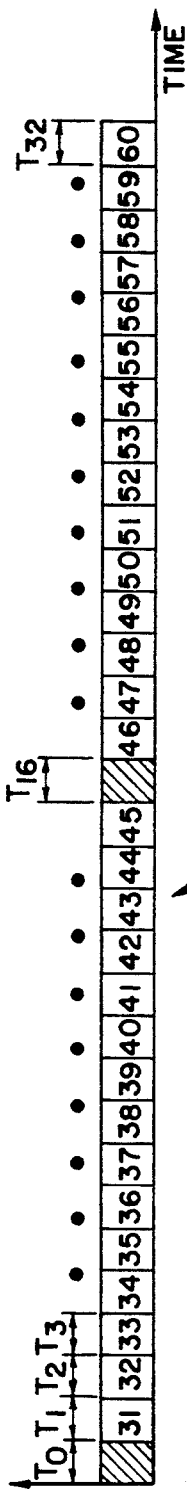

FIGS. 2A and 2B show the format of the TDM signals transmitted between the DTUs 301A and 302A and the TRANSMUX 401A of the converter unit 4A. Each signal is shown as carrying 30 digital voice channels (T1–T15 and T17–T32), one synchronization channel (T0) and one control channel (T16), the two signals together accounting for 60 voice channels.

Figure 3:
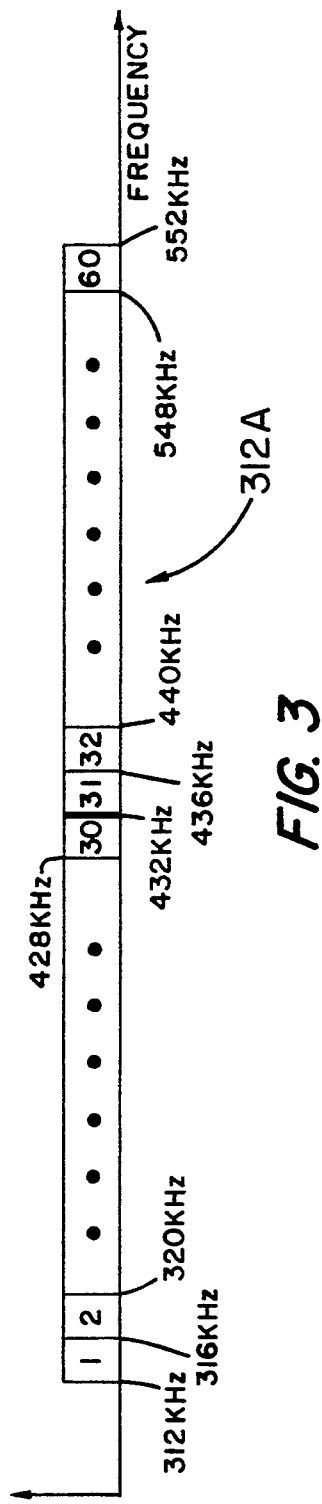
FIG. 3 shows the TDM voice channels of FIGS. 2A and 2B converted into a corresponding group of RF voice channels forming an RF voice channel sub-group.

FIG. 3 illustrates the FDM RF receiving voice channel sub-group signal transmitted between the TRANSMUX 401A and DEMUX/MUX 400A of the unit 4A. This signal results from frequency conversion of the TDM signals of FIGS. 2A and 2B. As shown, each digital voice channel is converted into a 4 KHz wide RF voice channel, resulting in 60 RF voice channels, each containing the voice, control and synchronization information pertaining to its associated digital channels.

Figure 4:
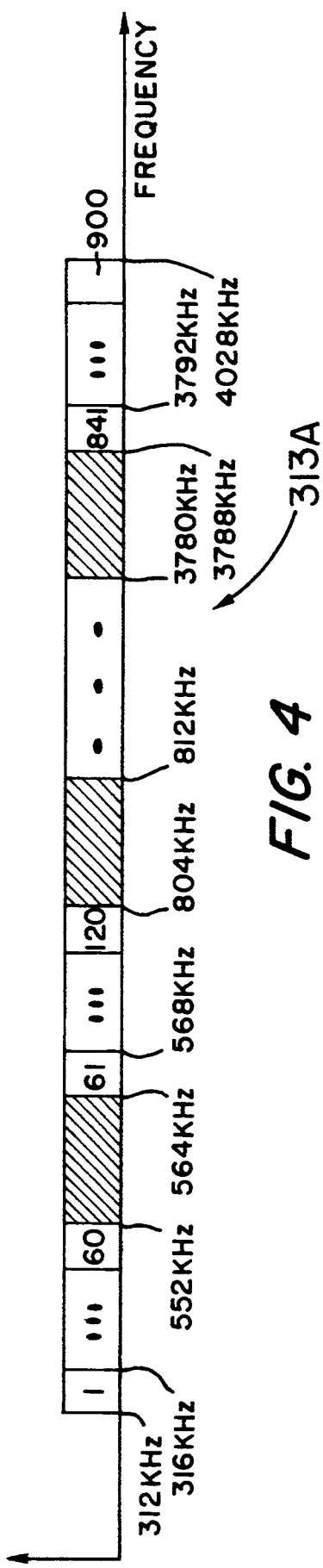
FIG. 4 shows additional RF voice channel sub-groups multiplexed with the voice channel sub-group of FIG. 3 to form a broadband RF voice channel group.

FIG. 4 illustrates the resultant FDM RF receiving voice channel group signal delivered by the DEMUX/MUX 400 as a result of the applied FDM RF subgroups from the TRANSMUXES 401A to 401N. The illustration assumes 15 TRANSMUXES in the converter 4A, resulting in (15×60) or 900 RF receive voice channels over a frequency band of 312 KHz to 4028 KHz.

Figure 5:
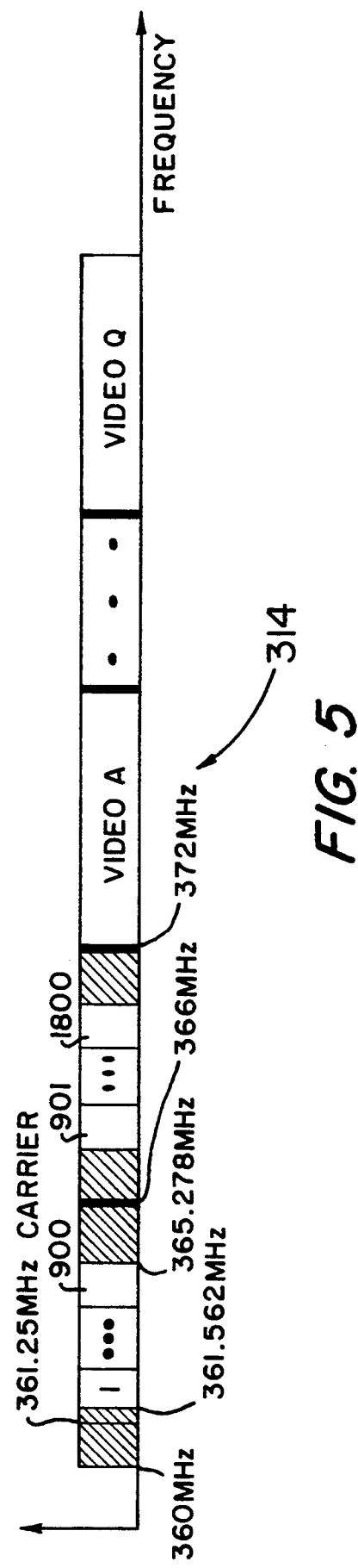
FIG. 5 shows the broadband RF voice channel group of FIG. 4 modulated onto an RF cable network carrier with other contiguous broadband RF voice channel groups and broadband RF video channels.

Finally, FIG. 5 shows the downstream network signal from the modulator/demodulator 206. As shown, the FDM RF receiving voice channel group of FIG. 4 has been modulated onto the network carrier (361.25 Mhz) in a first 6 MHz RF broadband channel. Also shown is another FDM RF receiving voice channel group containing RF voice channels 901 to 1800 modulated onto the network carrier in a second 6 MHz channel contiguous with the first channel. As mentioned earlier, the downstream signal also contains video channels, (VIDEO A and VIDEO B), also modulated onto the carrier in further multiplexed 6 MHz broadband channels.

As above-indicated, the RF transmitting and receiving voice channels are coupled to and from their corresponding subscriber locations via respective dropboxes 5A to 5Y. Referring to dropbox 5A for illustrative purposes, the dropbox comprises a VSB modulator/demodulator or modem 502A, a single channel multiplexer 501A, and an interface unit 500A. The VSB modem 502A has a receiving port 504A which connects to the downstream cable 202 at drop 211A and a transmitting port 503A which connects to the upstream cable 201 at drop 212A.

The VSB modem 502A is configured to demodulate or extract from the downstream network signal the broadband RF channel (i.e., 6 MHz channel) containing the RF receiving voice channel associated with the subscriber location 7A. Thus, assuming the subscriber location 7A corresponds to the RF receiving voice channel 1 in the network signal of FIG. 5A, the modem 502A will extract from this signal the first broadband RF channel (i.e, the 360–366 MHz channel), since it contains the RF receiving voice channel 1. Conversely, an RF transmitting voice channel 1 sent by the single channel multiplexer 501A to the VSB modem 502A will be modulated by the VSB modem 502A into the first broadband RF channel and then transmitted from port 503A of the modem to the upstream cable 201.

The first broadband RF voice channel (366–366 MHz) once extracted by the modem 502A, is then conveyed to the single channel multiplexer 501A which is configured to demodulate the RF channel group to obtain the associated RF receiving voice channel (channel 1) and return this channel to base band to recover the resultant 4 KHz baseband receiving channel. This channel is then processed to extract voice information (i.e., band limited to 300–3400 Hz) and also processed to extract any out-of-band signalling information. The voice information is then passed via output port 507A to an input port 505A of an interface unit 500A. The signalling information is, in turn, passed via another output port Mm to a further input port Ei of the interface unit.

In the transmit direction, the single channel multiplexer 501A receives at its input port 508A from the output port 506A of the interface unit 500A, baseband voice information. The multiplexer also receives signalling information at its Em port from the Mi port of the interface unit. This voice and signalling information is, in turn, modulated by the multiplexer into the RF transmitting voice channel (i.e., channel 1) and sent by the multiplexer to the modem 502A where it is placed in the first RF broadband channel of the network 2, as above-described.

The interface unit 500A provides a standard tip T and ring R connection to a phone 601A located at subscriber location 7A. The band-limited receiving voice channel information at the input terminal 505A of the interface unit 500A is provided to these connections so that voice information becomes available at the phone 601A. Further, transmitted voice information received from the phone 601A on the tip T and ring R connections is transferred by the output terminal 506A of the interface unit 500A to the single channel multiplexer for inclusion in the transmitting voice channel being transmitted at the subscriber location. The interface unit 500A also develops signalling information based upon the signalling information received at its Ei port and the state of the phone 601A. This signalling information is passed from the Mi port of the interface to the Em port of the modem where it is included in the RF transmitting voice channel developed by the modem, as above-described.

It is desirable to avoid frequency shifts in the modulating and demodulating process performed at the drop boxes 5A to 5Y. To achieve synchronization, the system 1 is further adapted to provide a synchronizing pilot signal at the drop boxes. This signal is supplied from the reference source used to generate the RF channel group signals at the DEMUX/MUX 400A.

Figure 6:
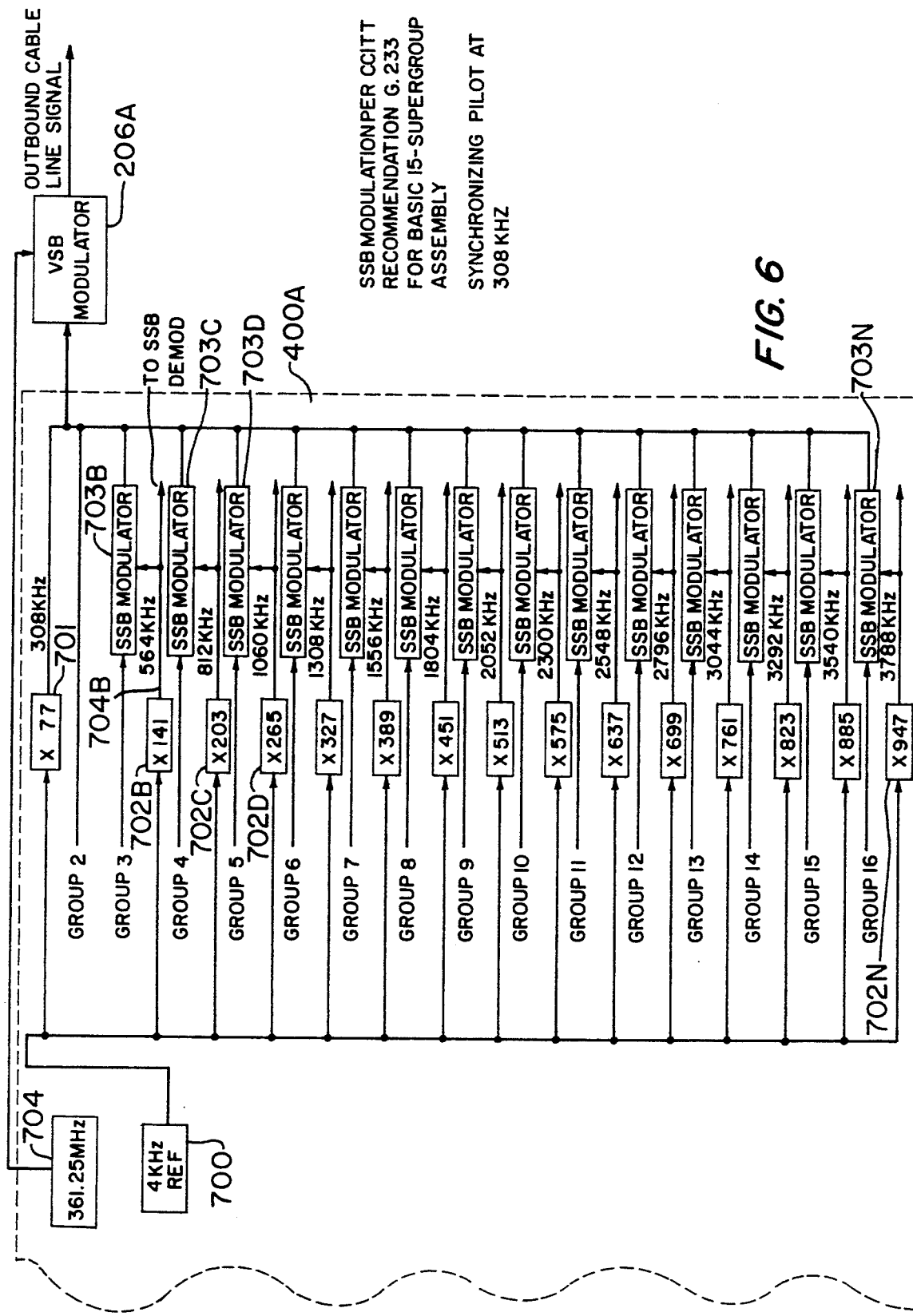
FIG. 6 shows schematically equipment for realizing the broadband RF voice channel group of FIG. 4.

FIG. 6 shows in greater detail the multiplexing section of the DEMUX/MUX 400A used to generate the RF channel group of FIG. 5. A 4 Khz reference frequency source 700 serves as the primary source for generating both pilot signal and reference frequencies for multiplexing the RF channel sub-groups (i.e., groups 2–16). More particulary, the reference frequency is applied to a pilot frequency multiplier 701 which multiplies the frequency by 77 to develop a 308 KHz pilot signal. This signal is modulated onto the network carrier provided by a carrier source 704 to the VSB modulator/demodulator 206. The pilot signal is then recovered at the drop boxes and used to develop reference frequencies for demodulation and modulation as described below.

As is also shown in FIG. 6, the 4 Khz reference frequency is also applied to suitable multipliers 702B–702N whose outputs are applied as reference frequencies to the single sideband modulators 703B–703N. The latter, in turn, modulate the RF frequency sub-groups to develop the RF channel group in FIG. 4. This channel group is also applied to modulator/demodulator 206 to generate the first broadband RF channel of the signal in FIG. 5.

Figure 7:
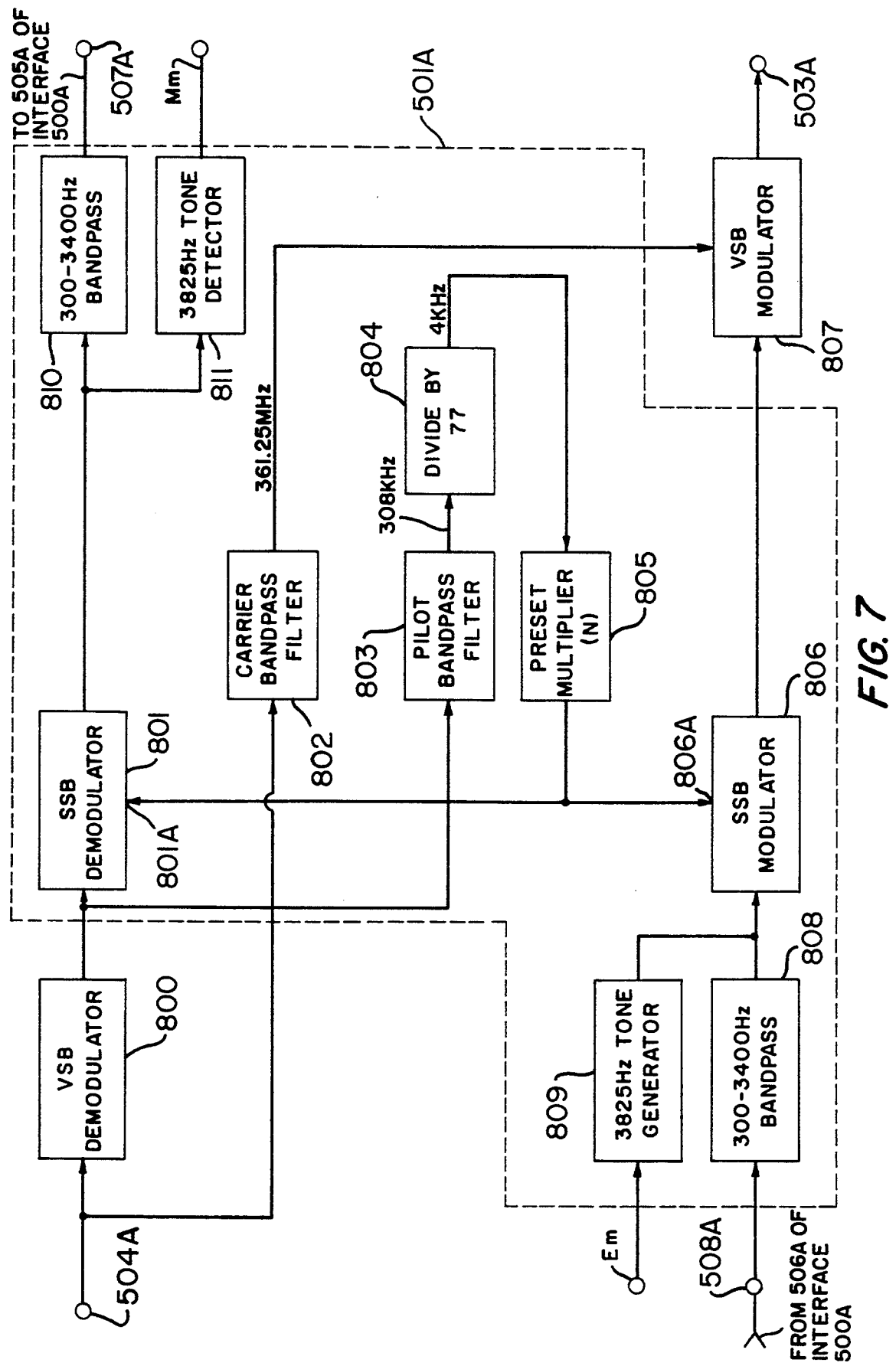
FIG. 7 shows the details of the modulation/demodulation apparatus used at the subscriber locations of the system of FIGS. 1A and 1B.

FIG. 7 shows in greater detail the VSB modem 502A and the single channel multiplexer 501A shown in FIG. 1 modified to utilize the pilot signal generated at the DEMUX/MUX for synchronization. The network signal received at the VSB modem input port 504A is supplied to a carrier bandpass filter 802 and, after passage to VSB demodulator 800, to a pilot bandpass filter 803. The network carrier bandpass filter 802 recovers the 361.25 Mhz network carrier, while the pilot bandpass filter 803 recovers the 308 Khz pilot signal. The recovered signals are then used in the modulator and demodulator processing to ensure synchronization.

More particularly, the recovered network carrier is applied to the VSB modulator 807 of the VSB MODEM 502, thereby ensuring that modulation occurs at the appropriate frequency. The 308 KHz pilot signal, in turn, is applied to a divide by 77 frequency divider 804 to recover the 4 Khz reference signal. This signal is then applied to a preset multiplier 805 to derive the reference frequency for the associated RF transmit and receive voice channels of the subscriber location (i.e., the frequency 312 Khz for the channel 1 of the location 7A). This reference frequency is then applied to the SSB Modulator 806 and the SSB Demodulator 801A of the multiplexer to provide the RF transmit voice channel and recover the baseband voice channel, respectively.

The multiplexer 501A of FIG. 7 also contains bandpass filters 808 and 810 which are used to band-limit the recovered baseband voice channel and the voice channel being transmitted, respectively. Also, the multiplexer is provided with an out-of-band tone generator 809 and an out-of-band tone detector 811. These components generate and detect a 3825 Hz tone which is used as signalling information in the RF transmit and receive voice channels of the subscriber locations.

More particulary, 3825 Hz signalling tones are used to provide an indication of on and off hook conditions and to generate ringing signals. In the present case, each interface unit provides simple logic changes to indicate the on and off hook conditions of its respective phone. These conditions are used to instruct tone generation by the respective multiplexer. Also, the switch 3 uses 3825 Hz tones to request connection to a subscriber location. These interactions will become apparent in the description of the operation of the system 1 set forth hereinbelow.

In the system of FIGS. 1A and 1B, the modems 502A–502Y used at the drop boxes 5A–5Y develop the RF transmitting channels as vestigial sideband signals. The resultant upstream signal on the line 201 thus comprises a number of vestigial sideband signals each carrying a part of the network carrier. These signals are received at the VSB modulator/demodulator 206 which, in accordance with conventional vestigial sideband principles, demodulates the signals by regenerating the network carrier from the received signals and using the regenerated carrier to demodulate the signals. This extracts the RF broadband channels containing the RF transmitting voice channel groups. Each broadband channel is then applied to the appropriate DEMUX/MUX.

Because the vestigial sideband signals in the upstream signal originate at different subscriber locations they will likely arrive at the modulator/demodulator 206 with different phases which may vary over time. As a result, the phase of the network carrier recovered by the VSB modulator/demodulator 206 from these signals may also vary with time.

If this varying phase of the recovered network carrier is found to be undesirable, the modulator/demodulator 206 can be suitably modified to utilize a network carrier for demodulation whose phase does not vary.

Figure 7A:
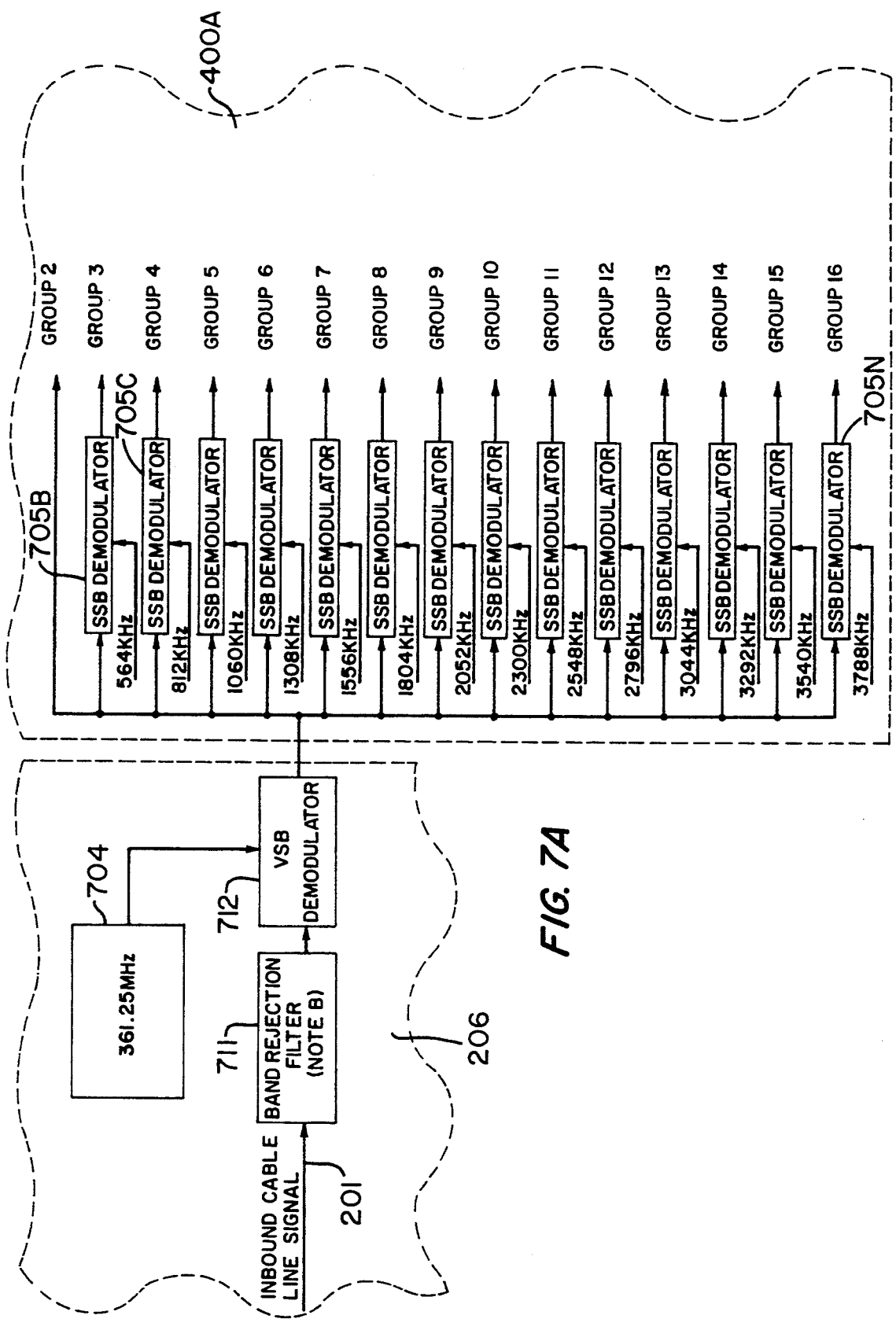
FIG. 7A shows the demodulation portion of the VSB modulator/demodulator of the cable network modified to ensure use of a network carrier having a stable phase.

FIG. 7A shows the demodulation portion of the modulator/demodulator 206 modified to realize this. As can be seen, the upstream signal into the demodulator is first passed through a band rejection filter 711 which is adapted to reject signals at the network carrier frequency (i.e., 361.25 MHz in the present example). The filtered signal is then passed into a VSB demodulator 712 which is now supplied with the network carrier from the carrier source 704 used to supply the VSB modulator 206A (see, FIG. 6). The demodulated signal is then applied to the demultiplexer section of the appropriate DEMUX/MUX to recover the RF channel sub-groups.

In FIG. 7A, the portion of the DEMUX/MUX 400A for recovering the channel sub-groups 2-16 shown in FIG. 6 is also illustrated. As shown, SSB demodulators 705B-705N supplied with appropriate demodulation frequencies recover the respective channel groups 2-16.

Figure 8:
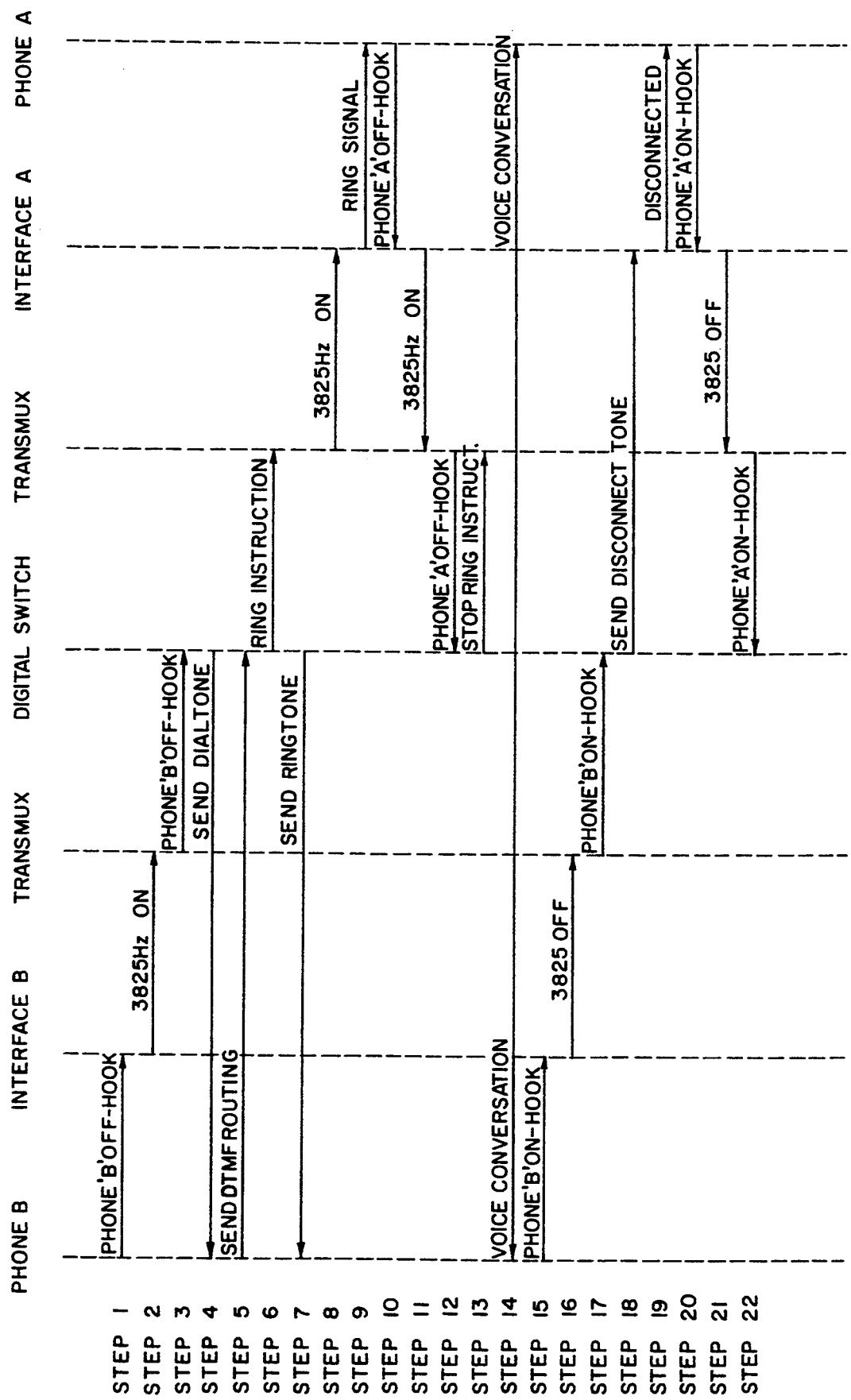
FIG. 8 shows a timing chart for operation of the system of FIGS. 1A and 1B.

FIG. 8 shows the sequence of events when placing a call from the phone 601B at the location 7B to the phone 601A at the location 7A. In the description, it will be assumed that the location 7A uses transmitting and receiving RF voice channel 1 and that the location 7B uses the transmitting and receiving RF voice channel 2, shown in FIGS. 3-5.

Step 1: —PHONE 601B OFF-HOOK—; When phone 601B goes off-hook, the interface 500B detects a change in the state of the associated tip T and ring R lines.

Step 2: —3825 Hz ON—; The interface 500B transfers a logic signal from its Mi port to the Em port of the single channel multiplexer 501B instructing it to turn on the 3825 Hz tone generator. This causes a 3825 Hz tone to be continuously transmitted in the associated RF transmitting voice channel 2 of the network signal of the modem 502B.

Step 3: —PHONE 601B OFF-HOOK—; The RF transmitting voice channel 2 containing the 3825 Hz tone is passed by the modulator/demodulator 206 and DEMUX/MUX 400A to the TRANSMUX 401A assigned to transmitting channel 2. The TRANSMUX detects the presence of the 3825 Hz tone and transmits an off hook signal to the TDM switch 302 via DTU 301A. This signal is carried in the control channel of the TDM signal carrying the transmit voice channel 2 and indicates to the switch that the channel 2 is off-hook.

Step 4: —SEND DIALTONE to PHONE 601B—; The TDM switch 302 places a dial tone signal in the control channel of the TDM signal carrying the receiving voice channel 2 and it is delivered by the DTU 301A to the TRANSMUX 401A. The latter places a dial tone in the RF receiving voice channel 2 which passes via the downstream network signal to the corresponding drop box 5B. This tone is extracted by bandpass filter 810 in the multiplexer 501B and passed through the interface circuit 500B to the T and R lines of phone 601B.

In the remaining discussion of the operating steps of the system 1, it will be understood that transmission between the drops boxes 5A and 5B and the TDM switch 3 occurs over the associated drop box components, the associated cables, the modulator/demodulator 206, and the associated DEMUX/MUX, TRANSMUX and DTU, although these components may not be specifically mentioned in the interests of brevity.

Step 5: —SEND DTMF PHONE NUMBER—; Upon receiving dial tone, the DTMF phone number of phone 601A is transmitted from phone 601B to the TDM switch 302 over the RF and corresponding digital voice channel 2. The digital switch looks up in memory the DTMF phone number dialed and determines that the phone being called is on voice channel 1, i.e., is the phone 601A.

Step 6: —RING INSTRUCTION—; The TDM switch 302 sends a message in the control channel of the TDM signal containing the voice channel 1 instructing the TRANSMUX 401A to turn on a 3825 Hz tone in RF receive voice channel 1.

Step 7: —T/SEND RING TONE TO ORIGINATOR—; The TDM switch 302 then sends a ringing tone to phone 601B voice channel 2.

Step 8: —3825 Hz ON—. The TRANSMUX 401A turns on the 3825 Hz signal for the receiving voice channel 1.

Step 9: —RING SIGNAL—. The single channel multiplexer 501A associated with receiving voice channel 1 and phone 601 detects the presence of the 3825 Hz signal and passes a logic signal from its Mm port to the Ei port of interface 500A. The interface 500A then generates a ring signal on the tip T and ring R lines of phone 501A.

Step 10: —PHONE A OFF-HOOK—; When phone 501A is answered there is a detectable change in the state of the associated tip T and ring R lines.

Step 11: —3825 Hz ON—; The interface 500A detects the change in state via a signal to its Em port from the Mi port of the interface. It then instructs the single channel multiplexer 501A to turn on its tone generator to initiate a continuous 3825 Hz tone in transmitting RF voice channel 1 and ceases generating the ringing signal on the tip R and ring R lines of phone 601A.

Step 12 —T-PHONE A OFF-HOOK—; The TRANSMUX associated with transmitting RF voice channel 1 detects the presence of the 3825 Hz tone in the RF voice channel 1 and transmits an off-hook signal to the TDM switch 302 via the control channel of the TDM signal containing the transmitting voice channel 1.

Step 13 —STOP RING INSTRUCTION—; The TDM switch stops the ringing tone being sent over the RF receiving voice channel 2.

Step 14: —VOICE CONVERSATION—; The TDM switch at this time has now established a virtual talk path between the calling phone 601B and the called phone 601A over the RF transmit and receive voice channels 2 and the RF transmit and receive voice channels 1. Bidirectional conversation can now occur.

Step 15: —PHONE 601B ON-HOOK—; When phone 601B goes on-hook (i.e., hangs up), the interface 500B detects a change in the state of the associated tip T and ring R line.

Step 16: —3825 Hz OFF—; The interface 500B via its Mi port instructs the single channel multiplexer 501B via its Em port to turn off the 3825 Hz tone generator.

Step 17: —PHONE 601B ON-HOOK—; The TRANSMUX 901A assigned to RF voice channel 2 detects the absence of the 3825 Hz tone and transmits an on hook signal to the TDM switch 302 in the control channel of the TDM signal containing the transmit voice channel 2.

Step 18: —SEND DISCONNECT TONE—; The TDM switch 302 then terminates the virtual path established between voice channel 2 and the voice channel 1, i.e., phones 601B and 601A. The TDM switch then transmits a message over the TDM signal containing the receiving voice channel 1 to the TRANSMUX instructing the TRANSMUX to turn off the 3825 tone in the voice channel 1.

Step 19: —DISCONNECTED—; The interface 500A detects the absence of a 3825 Hz tone in receiving voice channel 1 and sends dial tone to phone 601A.

Step 20: —PHONE ON-HOOK— When phone 601A is place on-hook there is a detectable change on its associated tip T and ring R lines.

Step 21: —3825 Hz OFF—; The interface 500A detects the change in state and instructs via its Mi port the single channel multiplexer 501A at its Em port to cease transmitting the 3825 Hz tone in RF voice channel 1.

Step 22 —PHONE 601A ON-HOOK—; The TRANSMUX associated with RF voice channel 1 detects the absence of the 3825 Hz tone in voice channel 1 and transmits an on-hook signal to the TDM switch 302.

The above described process is repeated for subsequent phone conversations.

Figure 9:
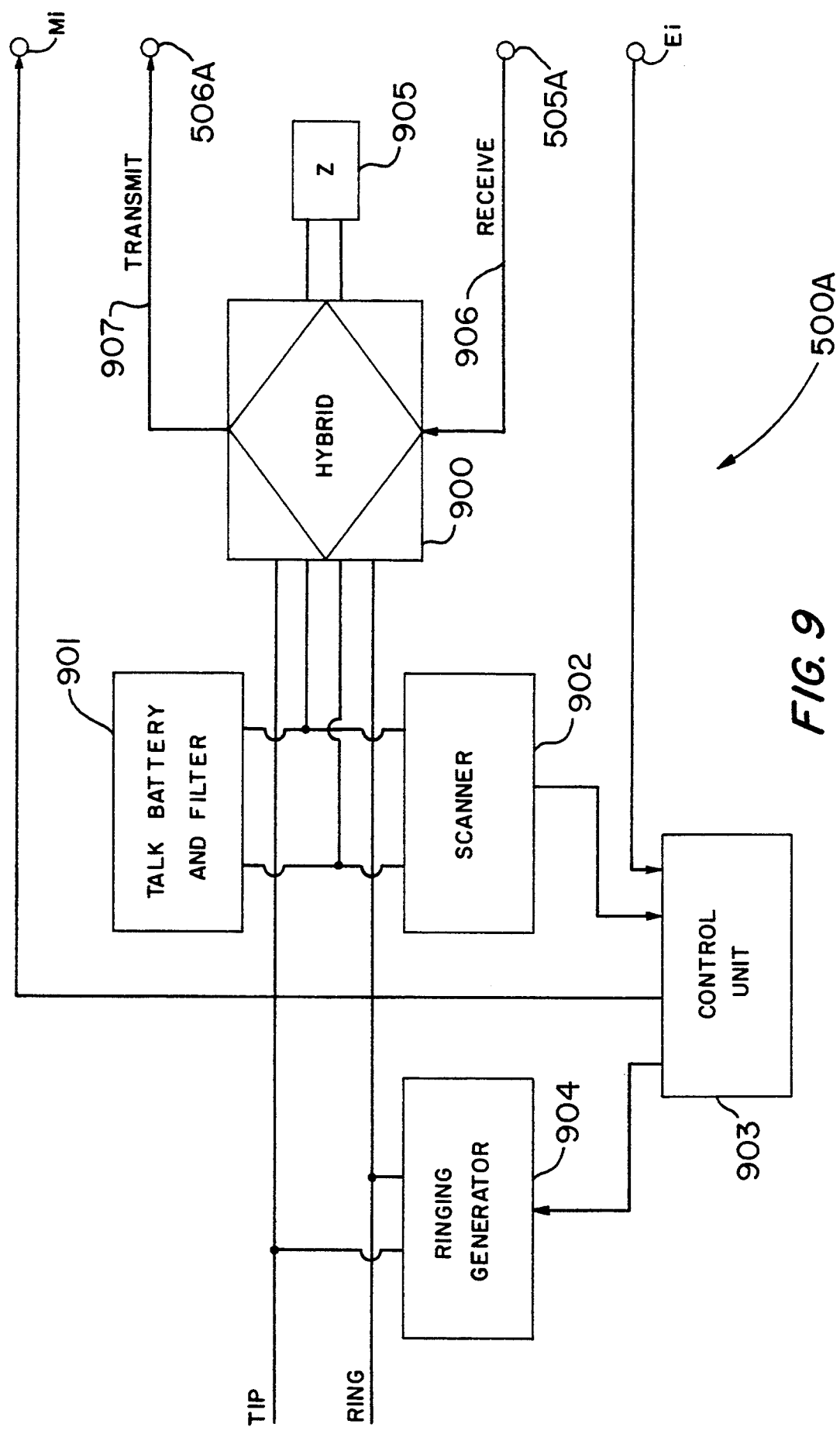
FIG. 9 shows the details of the interface unit used at the subscriber locations of the system of FIGS. 1A and 1B.

FIG. 9 shows in greater detail an example of the interface unit 500A. Similar units can be used for the other interface units 500B–500Y. As shown, a hybrid circuit 900, having a balancing impedance Z, depicted at 905, connects to the TIP and RING lines. A receive line 906 and a transmit line 907 from the input terminal 505A and the output terminal 506A, respectively, connect to the hybrid circuit 900. A scanner 902 is also connected to the hybrid 900 and detects whether the tip T and ring R lines indicate an on-hook or off-hook condition. A ringing generator 904 connects to the TIP and RING lines and generates a ringing signal when directed to do so by control unit 903.

A control unit 903 receives signals from the scanner 902 and the Ei input terminal. Further the control unit supplies control signals to the ringing generator 904 and the Mi output terminal. The various states of ports Ei, Mi, the scanner 902 and the ring generator 904 as controlled by the control unit 903 are given below. These states follow from the above discussion of the operation of the system 1. States 1–3 relate to a calling phone and states 4–6 relate to a called phone. An off-hook status indicates an active state and on one-hook status an inactive state.

Figure 10:
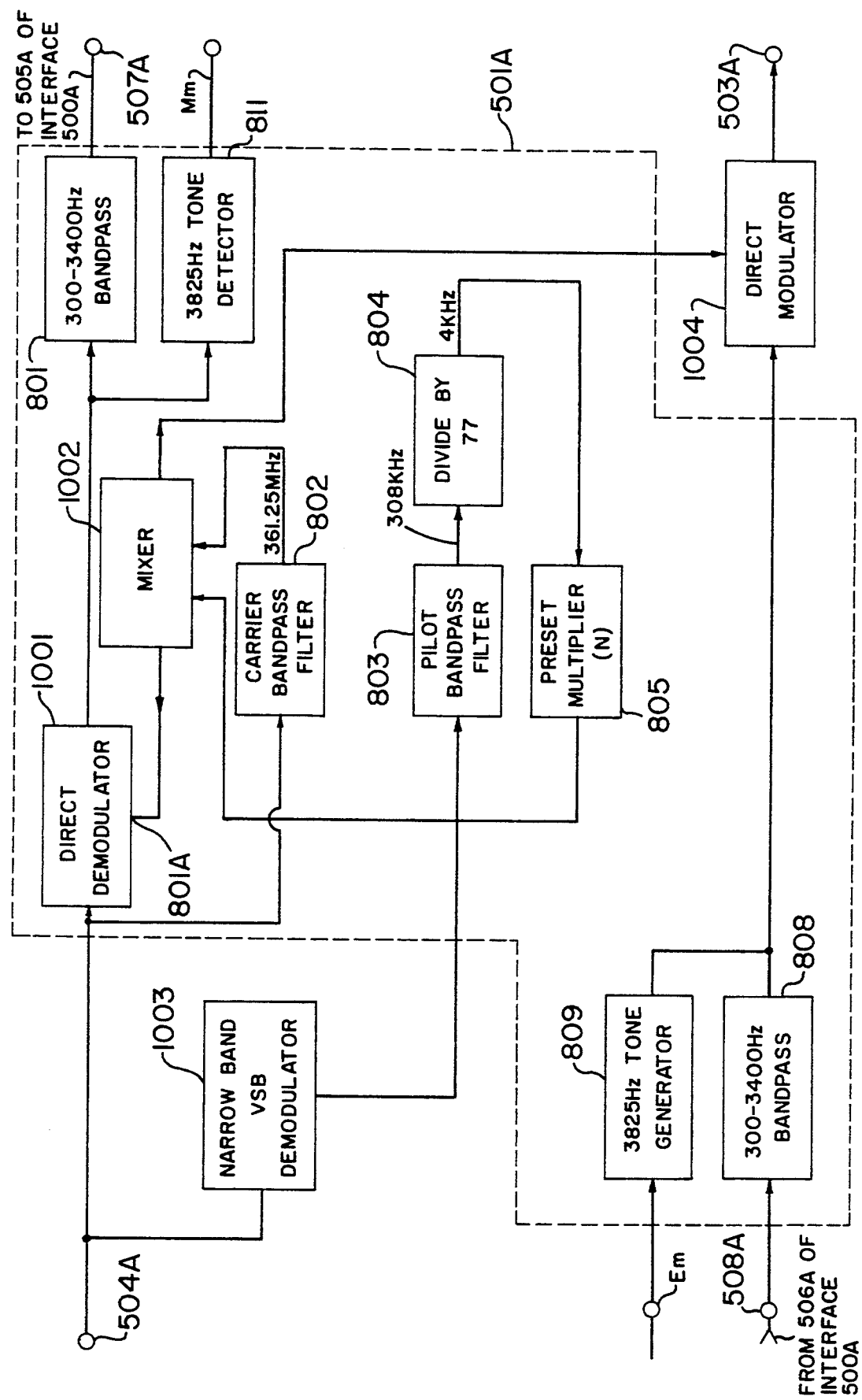
FIG. 10 illustrates a modification of the modulation/demodulation apparatus of FIG. 7.

State 1: When a phone is idle
Scanner=on hook
Ei=on hook
Mi=on hook
Ring Gen.=no ring
Switch 302=not connected
State 2: Initiating a call
Scanner=off hook
Ei=on hook
Mi=off hook
Ring Gen.=no ring
Switch 302=dial tone, busy tone, ringing tone
State 3: Connection with destination
Scanner=off hook
Ei=off hook
Mi=off hook
Ring Gen.=no ring
Switch 302=connected
State 4: incoming call
Scanner=on hook
Ei=off hook
Mi=on hook
Ring Gen.=ring
Switch 302=not connected
State 5: phone answered
Scanner=off hook
Ei=off hook
Mi=off hook
Ring Gen.=no ring
Switch 302=connected
State 6: Calling phone disconnects
Scanner=off hook
Ei=on hook
Mi=off hook
Ring Gen.=no ring
Switch 302=not connected FIG. 10 illustrates a modification of the VSB modem and single channel multiplexer shown in FIG. 7. In the case of FIG. 10, the RF transmitting and receiving channels are developed by direct modulation and demodulation, respectively. This is realized, in the case of the RF transmitting channel, by modulating the voice and signalling information directly at the frequency desired for the transmitting channel in the associated RF broadband channel. In the case of the RF receiving channel, it is realized by demodulating the received signal directly at the frequency of the RF receiving channel in its associated RF broadband channel. Furthermore, the pilot signal is recovered from the received signal in the FIG. 10 arrangement by using a VSB demodulator whose frequency band of operation need only be sufficiently wide to reach the pilot frequency as modulated onto the network carrier.

In FIG. 10, those components which are the same as those in FIG. 7 have been numbered the same. As shown, the downstream signal received at port 504A is applied to direct demodulator 1001 which directly recovers the RF receiving channel by demodulation at the specific carrier frequency of the channel in the downstream signal. For example, in the case of the RF receiving channel 1 in FIG. 5, the demodulation frequency applied to demodulator 1001 to recover the channel would be at 361.562 MHz. The latter frequency is generated by a mixer 1002 which multiplies the recovered network carrier signal (361.25 MHz) by the output signal (for channel 1 this output is at 312 KHz) of the present multiplier 805.

As in FIG. 7, the preset multiplier 805 develops its output signal by multiplying the 4 KHz reference signal by the factor N. The 4 KHz reference is obtained at the output of the divide by 77 circuit 804 which divides the 308 KHz synchronization pilot signal developed at the output of pilot bandpass filter 803.

The 308 KHz synchronization signal is generated, in this case, from the downstream signal by first passing it through a narrow bandpass VSB demodulator 1003. The pass band of this demodulator need only be sufficient to extend to the 308 KHz syncronization signal as modulated on the network carrier (i.e., extend to 361.588 MHz). The output of the demodulator is then fed to bandpass filter 803 to recover the actual 308 KHz signal.

The output of mixer 1002 is also applied to direct modulator 1004. This results in the input voice and signalling signals to the modulator being directly modulated at frequency (in the case of channel 1 at 361.562 MHz) which places the RF transmitting channel at the desired frequency position in the upstream signal.

It should noted that the TDM switch 302, the TDUs, TRANSMUXES and the DEMUX/MUX of the digital switch 3 and converter 4 can be provided by suitably modified conventionally available components operating on a usual CCITT standard used for TDM transmission. A particular example of a TDM switch 3 might be a Harris #20-20 digital switch equipped with a Harris #2MB DTU operating at CCITT recommendation G.700. An example of a suitable TRANSMUX might be the DSC-Granger TM 7800-M1 TRANSMUX. A suitable DEMUX/MUX would be one operating in accordance with CCITT recommendation G.233.

As can be appreciated, with the system 1, it is now possible to provide voice communication, via the cable network 2 and the centralized switch 3, between a large number of subscriber locations. For the present illustrative case, 900 voice channels corresponding to 900 subscriber locations have been provided in each 6 MHz RF broadband channel of the cable network, as compared to only 28 channels and locations for the prior art systems. Moreover, the 900 channels in each 6 MHz broadband channel can be connected to each other and any of the channels in the other 6 MHz channels. Accordingly, by suitable selection of the number of broadband channels of the network 2 allocated to voice transmission, 10,000 or more selectively interconnectable voice channels can be provided.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. In particular, while the invention has been illustrated in terms of analog modulation of carrier signals in the RF channels, other types of modulation, such as, for example, digital modulation of carrier signals in the RF channels could also be used.

What is claimed is:

1. A system comprising:
   a plurality of telephone subscriber locations, each telephone subscriber location including means for establishing an RF transmitting channel and an RF receiving channel associated with the subscriber location for conveying signalling and analog voice information from and to, respectively, the subscriber location;
   the RF transmitting channels of said subscriber locations forming one or more transmitting frequency-division-multiplexed signals and the RF receiving channels of said subscriber locations forming one or more receiving FDM signals;
   a broad band cable network for carrying the RF receiving and transmitting channels of said subscriber locations via said one or more transmitting frequency-division-multiplexed signals and said one or more receiving frequency-division-multiplexed signals;
   and central switch means responsive to said cable network for enabling each RF transmitting channel in the one or more transmitting frequency-division-multiplexed signals on the cable network to be selectively coupled to any of the RF receiving channels in the one or more receiving frequency-division-multiplexed signals on the cable network, whereby voice communication between the subscriber locations of the coupled channels is enabled, said central switch means including: first means for establishing for each RF transmitting channel a transmitting digital channel for carrying digital voice information corresponding to the analog voice information carried by the RF transmitting channel and for establishing first digital control channels for carrying the signalling information of the RF transmitting channels, said transmitting digital channels and said first digital control channels forming one or more transmitting time-division-multiplexed signals each of which containing a number of transmitting digital channels and a first control channel carrying the signalling information for said number of transmitting digital channels, said first means including transmultiplexer means for converting said one or more transmitting frequency-division-multiplexed signals into said one or more transmitting time-division-multiplexed signals; digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, said digital switch means selectively coupling each transmitting digital channel in said one or more transmitting time-division-multiplexed signals to any of the receiving digital channels in said one or more receiving time-division-multiplexed signals; and said transmultiplexer means of said first means converting said one or more receiving time-division-multiplexed signals to said one or more receiving frequency-division-multiplexed signals.

2. A system in accordance with claim 1 wherein:
   said cable network carries a number of RF broadband channels;
   one or more groups of said transmitting frequency-division-multiplexed signals are carried in one or more of said RF broadband channels;
   and one or more groups of said receiving frequency-division-multiplexed signals are carried in one or more of said broadband RF channels.

3. A system in accordance with claim 2 wherein:
   said RF broadband channels are carried on said network on a network carrier signal having a preselected RF frequency;
   said means for establishing said RF transmitting channels are such that said RF transmitting channels form said one or more groups of transmitting frequency-division-multiplexed signals carried in said one or more RF broadband channels on said network carrier signal;

said cable network includes: means for arranging said one or more groups of receiving frequency-division-multiplexed signals in said one or more groups of RF broadband channels on said network carrier signal; and means for extracting said one or more groups of said one or more transmitting frequency-division-multiplexed signals from said RF broadband channels carried on said network carrier signal.

4. A system in accordance with claim 3 wherein:

said central switch further includes:

means for separating from each other the transmitting frequency-division-multiplexed signals in each of said one or more groups of transmitting frequency-division-multiplexed signals extracted by said extracting means; and means for combining said one or more receiving frequency-division-multiplexed signals into said one or more groups of receiving frequency-division-multiplexed signals.

5. A system in accordance with claim 1 wherein:

each said subscriber location further includes: means adapted to be responsive to a telephone at said subscriber location for identifying an off-hook condition of said telephone; means responsive to said identifying means for generating an off-hook signal indicative of said off-hook condition; and said means for establishing said RF transmitting channel at said subscriber location includes said off-hook signal in said RF transmitting channel.

6. A system in accordance with claim 5 wherein:

each said subscriber location further includes: a ringing circuit for generating a ringing signal and providing said ringing signal to a telephone at said subscriber location; and said means for establishing said RF receiving channel at said subscriber location includes means for detecting a ringing signal instruction in said RF receiving channel and instructing said ringing circuit to generate said ringing signal.

7. A system in accordance with claim 6 wherein:

said off-hook signal comprises the presence or absence of a preselected first tone;

and said ringing signal instruction comprises the presence or absence of a preselected second tone.

8. A system in accordance with claim 7 wherein:

said first and second tones are the same.

9. A system in accordance with claim 1 wherein:

each said subscriber location further includes: means for extracting a synchronization signal froms said RF receiving channel established at said subscriber location; and said means for establishing said RF transmitting channel at said subscriber location is responsive to said synchronization signal.

10. A system in accordance with claim 1 further comprising:

means for supplying one or more video signals;
and said cable network carries said video signals.

11. A system in accordance with claim 1 wherein:

each of said RF transmitting channels is able to carry one or more of off-hook and called telephone number signalling information;

each of said RF receiving channels is able to carry one or more of busy, ringing and dial tone signalling information;

and said central switch: in response to off-hook signalling information in an RF transmitting channel indicating that a telephone at the corresponding subscriber location is off-hook, places dial tone signalling information in the RF receiving channel corresponding to the subscriber location; in response to called telephone number signalling information in an RF transmitting channel, places ringing signal information in the RF receiving channel of the subscriber location having the called telephone number; and in response to off-hook signalling information in the RF transmitting channel of a called telephone at a subscriber location, selectively connects the RF transmitting and RF receiving channels of the calling subscriber location to the RF transmitting and RF receiving channels of the called subscriber location.

12. A method comprising:

for each of a plurality of telephone subscriber locations, establishing an RF transmitting channel and an RF receiving channel associated with the subscriber location for conveying signalling and voice information from and to, respectively, the subscriber location;

the RF transmitting channels of said subscriber locations forming one or more transmitting frequency-division-multiplexed signals and the RF receiving channels of said subscriber locations forming one or more receiving frequency-division-multiplexed signals;

carrying the RF receiving and transmitting channels of said user locations on a broad band cable network via said one or more transmitting frequency-division-multiplexed signals and one or more receiving frequency-division-multiplexed signals;

and using a central switch means to enable each RF transmitting channel in the one or more transmitting frequency-division-multiplexed signals on the cable network to be selectively coupled to any of the RF receiving channels in the one or more receiving frequency-division-multiplexed signals on the cable network, whereby voice communication between the subscriber locations of the coupled channels is enabled, said enabling switch of said central switch means including: establishing for each RF transmitting channel a transmitting digital channel for carrying digital voice information corresponding to the analog voice information carried by the RF transmitting channel and establishing first digital control channels for carrying the signalling information of the RF transmitting channels, said transmitting digital channels and said first digital control channels forming one or more transmitting time-division-multiplexed signals each containing a number of transmitting digital channels and a first control channel carrying the signalling information for said number of transmitting digital channels, said steps of establishing including using a transmultiplexer means for converting said one or more transmitting frequency-division-multiplexed signals to said one or more transmitting time-division-multiplexed signals; using a digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, and further using said digital switch means to selectively couple each transmitting digital channel in said one or more transmitting time-division-multiplexed signals to any of the receiving digital channels in said one or more receiving time-division-multiplexed signals; and using said transmultiplexer means to convert said one or more receiving time-division-multiplexed signals to said one or more receiving frequency-division-multiplexed signals.

13. A method accordance with claim 12 wherein:
said cable network carries a number broadband RF channels;
one or more groups of said transmitting frequency-division-multiplexed signals are carried in one or more of said broadband RF channels;
and one or more groups of said receiving frequency-division-multiplexed signals are carried in one or more of said broadband RF channels.

14. A method in accordance with claim 13 wherein:
said RF broadband channels are carried on said network on a network carrier signal having a preselected RF frequency;
said step of establishing said RF transmitting channels is such that said RF transmitting channels form said one or more groups of transmitting frequency-division-multiplexed signals carried in said one or more RF broadband channels on said network carrier signal;
said carrying of said RF transmitting and receiving signals on said cable network includes: arranging said one or more groups of receiving frequency-division-multiplexed signals in said one or more groups of RF broadband channels on said network carrier signal; and extracting said one or more groups of said one or more transmitting frequency-division-multiplexed signals from said RF broadband channels carried on said network carrier signal.

15. A method in accordance with claim 14 wherein:
said step of enabling using said central switch means further includes:
separating from each other the transmitting frequency-division-multiplexed signals in each of said one or more groups of transmitting frequency-division-multiplexed signals extracted in said extracting step; and
combining said one or more receiving frequency-division-multiplexed signals into said one or more groups of receiving frequency-division-multiplexed signals.

16. A method in accordance with claim 12 further comprising:
at each said subscriber location: identifying an off-hook condition of a telephone at said subscriber location; generating an off-hook signal indicative of said off-hook condition; and said step of establishing said RF transmitting channel at said subscriber location includes including said off-hook signal in said RF transmitting channel.

17. A method in accordance with claim 16 further comprising:
at each said subscriber location: generating a ringing signal and providing said ringing signal to a telephone at said subscriber location; and said step of establishing said RF receiving channel at said subscriber location includes detecting a ringing signal instruction in said RF receiving channel and instructing said ringing circuit to generate said ringing signal.

18. A method in accordance with claim 17 wherein:
said off-hook signal comprises the presenece or absence of a preselected first tone;
and said ringing signal instruction comprises the presence or absence of a preselected second tone.

19. A method in accordance with claim 18 wherein:
said first and second tones are the same.

20. A method in accordance with claim 12 further comprising:
at each said subscriber location: extracting a synchronization signal from said RF receiving channel established at said subscriber location; and said step of establishing said RF transmitting channel at said subscriber location is carried out using said synchronization signal.

21. A method in accordance with claim 12 further comprising:
supplying one or more video signals;
and carrying said video signals on said cable network.

22. A method in accordance with claim 12 wherein:
each of said RF transmitting channels is able to carry one or more of off-hook and called telephone number signalling information;
each of said RF receiving channels is able to carry one or more of busy, ringing and dial tone signalling information;
and said step of using said central switch includes: in response to off-hook signalling information in an RF transmitting channel indicating that a telephone at the corresponding subscriber location is off-hook, placing dial tone signalling information in the RF receiving channel corresponding to the subscriber location; in response to called telephone number signalling information in an RF transmitting channel, placing ringing signal information in the RF receiving channel of the subscriber location having the called telephone number; and in response to off-hook signalling information in the RF transmitting channel of a called telephone at a subscriber location, selectively connecting the RF transmitting and RF receiving channels of the calling telephone subscriber location to the RF transmitting and RF receiving channels of the called subscriber location.

23. Apparatus for use with telephone subscriber locations, each telephone subscriber location including means for establishing an RF transmitting channel and an RF receiving channel associated with the subscriber location for conveying signalling and analog voice information from and to, respectively, the subscriber location, the RF transmitting channels of said subscriber locations forming one or more transmitting frequency-division-multiplexed signals and the RF receiving channels of said subscriber locations forming one or more receiving frequency-division-multiplexed signals; and with a broad band cable network for carrying the RF receiving and transmitting channels of said subscriber locations via said one or more transmitting frequencydivision-multiplexed signals and said one or more receiving frequency-division-multiplexed signals, said apparatus comprising:

central switch means responsive to said cable network for enabling each RF transmitting channel in the one or more transmitting frequency-division-multiplexed signals on the cable network to be selectively coupled to any of the RF receiving channels in the one or more receiving frequency-division-multiplexed signals on the cable network, said central switch means including: first means for establishing for each RF transmitting channel a transmitting digital channel for carrying digital voice information corresponding to the analog voice information carried by the RF transmitting channel and for establishing first digital control channels for carrying the signalling information of the RF transmitting channels, said transmitting digital channels and said first digital control channels forming one or more transmitting time-division-multiplexed signals each of which containing a number of transmitting digital channels and a first control channel carrying the signalling information for said number of transmitting digital channels, said first means including transmultiplexer means for converting said one or more transmitting frequency-division-multiplexed signals into said one or more transmitting time-division-multiplexed signals; digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, said digital switch means selectively coupling each transmitting digital channel in said one or more transmitting time-division-multiplexed signals to any of the receiving digital channels in said one or more receiving time-division-multiplexed signals; and said transmultiplexer means of said first means converting said one or more receiving time-division-multiplexed signals to said one or more receiving frequency-division-multiplexed signals;

and means adapted to couple said central switch means and said cable network.

24. Apparatus in accordance with claim 23 wherein: said cable network carries a number of RF broadband channels; one or more groups of said transmitting frequency-division-multiplexed signals are carried in one or more of said RF broadband channels; and one or more groups of said receiving frequency-division-multiplexed signals are carried in one or more of said broadband RF channels; said RF broadband channels are carried on said network on a network carrier signal having a preselected RF frequency; said means for establishing said RF transmitting channels are such that said RF transmitting channels form said one or more groups of transmitting frequency-division-multiplexed signals carried in said one or more RF broadband channels on said network carrier signal; said cable network further includes: means for arranging said one or more groups of receiving frequency-division-multiplexed signals in said one or more groups of RF broadband channels on said network carrier signal; and means for extracting said one or more groups of said one or more transmitting frequency-division-multiplexed signals from said RF broadband channels carried on said network carrier signal; and wherein:

said central switch means further includes:

means for separating from each other the transmitting frequency-division-multiplexed signals in each of said one or more groups of transmitting frequency-division-multiplexed signals extracted by said extracting means;

and means for combining said one or more receiving frequency-division-multiplexed signals into said one or more groups of receiving frequency-division-multiplexed signals.

25. A method for use with telephone subscriber locations, each telephone subscriber location including means for establishing an RF transmitting channel and an RF receiving channel associated with the subscriber location for conveying signalling and analog voice information from and to, respectively, the subscriber location, the RF transmitting channels of said subscriber locations forming one or more transmitting frequency-division-multiplexed signals and the RF receiving channels of said subscriber locations forming one or more receiving frequency-division-multiplexed signals, and with a broad band cable network for carrying the RF receiving and transmitting channels of said subscriber locations via said one or more transmitting frequency-division-multiplexed signals and said one or more receiving frequency-division-multiplexed signals, said method comprising:

using a central switch means responsive to said cable network for enabling each RF transmitting channel in the one or more transmitting frequency-division-multiplexed signals on the cable network to be selectively coupled to any of the RF receiving channels in the one or more transmitting frequency-division-multiplexed signals on the cable network, said enabling step of said central switch means including: establishing for each RF transmitting channel a transmitting digital channel for carrying digital voice information corresponding to the analog voice information carried by the RF transmitting channel and establishing first digital control channels for carrying the signalling information of the RF transmitting channels, said transmitting digital channels and said first digital control channels forming one or more transmitting time-division-multiplexed signals each containing a number of transmitting digital channels and a first control channel carrying the signalling information for said number of transmitting digital channels, said steps of establishing including using a transmultiplexer means for converting said one or more transmitting frequency-division-multiplexed signals to said one or more transmitting time-division-multiplexed signals; using a digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, and further using said digital switch means to selectively couple each transmitting digital channel in said one or more transmitting time-division-multiplexed signals to any of the receiving digital channels in said one or more receiving time-division-multiplexed signals; and using said transmultiplexer means to convert said one or more receiving time-division-multiplexed signals to said one or more receiving frequency-division-multiplexed signals; and coupling said central switch means and said cable network.

26. A method in accordance with claim 25 wherein: said cable network carries a number of RF broadband channels; one or more groups of said transmitting frequency-division-multiplexed signals are carried in one or more of said RF broadband channels; and one or more groups of said receiving frequency-division-multiplexed signals are carried in one or more of said broadband RF channels; said RF broadband channels are carried on said network on a network carrier signal having a preselected RF frequency; said means for establishing said RF transmitting channels are such that said RF transmitting channels form said one or more groups of transmitting frequency-division-multiplexed signals carried in said one or more RF broadband channels on said network carrier signal; said cable network further includes: means for arranging said one or more groups of receiving frequency-division-multiplexed signals in said one or more groups of RF broadband channels on said network carrier signal; and means for extracting said one or more groups of said one or more transmitting frequency-division-multiplexed signals from said RF broadband channels carried on said network carrier signal; and wherein:
said step of enabling using said central switch means further includes:
separating from each other the transmitting frequency-division-multiplexed signals in each of said one or more groups of transmitting frequency-division-multiplexed signals extracted by said extracting means; and
combining said one or more receiving frequency-division-multiplexed signals into said one or more groups of receiving frequency-division-multiplexed signals.

27. A system in accordance with claim 1 wherein:
said central switch means includes: a reference frequency source; means for using said reference frequency source to establish a pilot signal in each of a number of RF broadband channels to be carried by said cable network; modulation means for using said reference frequency source to establish each RF receiving channel in an associated one of said RF broadband channels;
said cable network includes: a network carrier source for generating a network carrier signal at a preselected frequency; and further modulation means for modulating said RF broadband channels onto said network carrier signal to form a network signal;
said means for establishing the associated receiving channel at each subscriber location includes: means for coupling said network signal from said cable network; means for extracting said network carrier signal from said network signal; means for extracting from said network signal said pilot signal and recovering from said pilot signal said reference frequency; demodulation means responsive to said extracted network carrier signal and said recovered reference frequency to recover from the associated RF receiving channel the voice and signalling information therein;
and said means for establishing the associated RF transmitting channel at each subscriber location includes: modulation means responsive to said extracted network carrier signal and recovered reference frequency and to the voice and signalling information at the subscriber location for establishing the RF transmitting channel in a corresponding RF broadband channel and for modulating said RF broadband channel onto said network carrier signal.

28. A system in accordance with claim 23 wherein
said modulation means of said central switch means is a SSB modulation means;
said further modulation means of said cable network is a VSB modulation means;
said demodulation means at each said subscriber locations includes: a VSB demodulator responsive to said network signal to develop the associated RF broadband channel; and a SSB demodulator responsive to the developed RF broadband channel and to a multiple of the recovered reference frequency to develop said voice and signalling information;
said means for establishing said RF receiving and transmitting channels at each said subscriber locations include multiplier means for multiplying the recovered reference frequency by a preset amount to generate a multiple of said recovered reference frequency;
and said modulation means at each said subscriber locations includes: a SSB modulator responsive to the voice and signalling information at said subscriber location and to the multiple of said recovered reference frequency; VSB modulation means responsive to the output of said SSB modulation means and to said extracted network carrier signal.

29. A system in accordance with claim 27 wherein;
said modulation means of said central switch means is a SSB modulation means;
said further modulation means of said cable network is a VSB modulation means;
said means for extracting said pilot signal and recovering therefrom said reference frequency includes a narrow band VSB demodulator;
said means for establishing said RF transmitting and RF receiving channels at each subscriber location further includes; means for multiplying the recovered reference frequency by a preset amount to generate a multiple of the reference frequency; and means for mixing the multiple of the reference frequency with the extracted network carrier signal;
said demodulation means at each said subscriber locations includes direct demodulation means responsive to the network signal and the output of said mixer for directly recovering the voice and signalling information in the associated RF receiving channel;

and said modulation means at each said subscriber locations includes direct modulation means responsive to the voice and signalling information at the subscriber location and to the extracted network carrier signal and the multiple of the reference frequency for directly modulating said information onto said network carrier signal in the associated RF broadband channel.

30. A system in accordance with claim 1 wherein:

said cable network carries said RF transmitting channels of said subscriber locations in one or more RF broadband channels carried on a network carrier signal of a network signal and includes: means for receiving the network signal and for suppressing the network carrier signal included in said network signal; means for generating the network carrier signal; means responsive to the output of said network carrier suppression means and to said network carrier generating means for recovering the one or more RF broadband channels from said network signal.

31. A system in accordance with claim 30 wherein:

said network signal is a VSB signal;

and said recovering means includes a VSB demodulator.

* * * * *

UNITED STATES PATENT AND TRADEMARK OFFICE
CERTIFICATE OF CORRECTION

PATENT NO. : 5,351,234

DATED : September 27, 1994

INVENTOR(S) : John D. Beierle, et al.

It is certified that error appears in the above-identified patent and that said Letters Patent is hereby corrected as shown below:

```
Col. 1,  line 44.   Change "digial" to -- digital --.

Col. 3,  line 20.   Change "shows" to -- show --.

Col. 5,  line 52.   Change "syncroniztion" to -- syncronization --.

Col. 10, line 25.   Change "-T/SEND" to -- -SEND --.

Col. 10, line 49.   Change "-T-PHONE" to -- -PHONE --.

Col. 11, line 22.   Change "place" to -- placed --.

Col. 11, line 56.   Change "on one-hook" to -- an on-hook --.

Col. 15, line 53.   Change "froms" to -- from --.

Col. 16, line 32.   Change "user" to -- subscriber --.

Col. 17, line 19.   After "number" insert -- of --.

Col. 18, line 12.   Change "presenece" to -- presence --.
```

UNITED STATES PATENT AND TRADEMARK OFFICE
CERTIFICATE OF CORRECTION

PATENT NO. : 5,351,234
DATED : September 27, 1994
INVENTOR(S) : John D. Beierle, et al.

It is certified that error appears in the above-indentified patent and that said Letters Patent is hereby corrected as shown below:

Col. 22, line 21.  Change "23" to -- 27 --.

Signed and Sealed this

Seventeenth Day of January, 1995

Attest:

BRUCE LEHMAN

Attesting Officer        Commissioner of Patents and Trademarks